Figure 1:
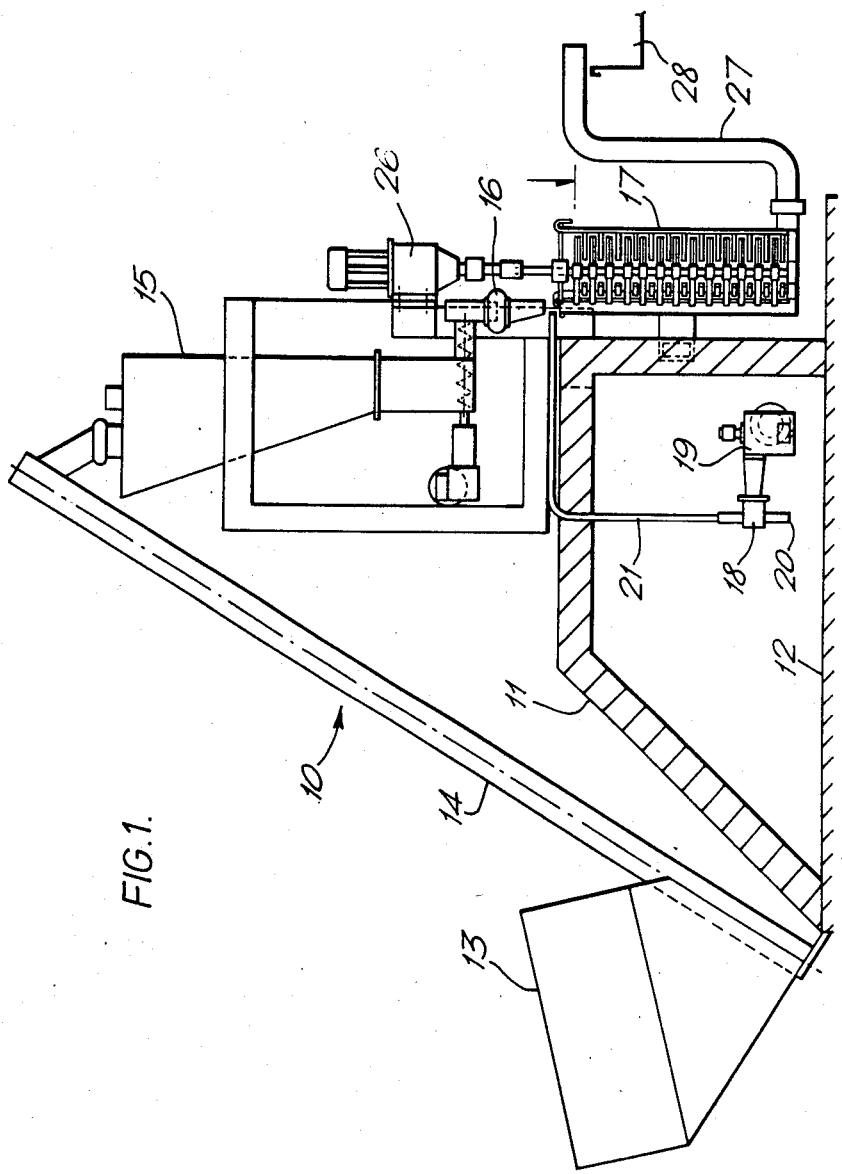

United States Patent [19]

Akesson

[11] Patent Number: 4,687,674
[45] Date of Patent: Aug. 18, 1987

[54] CONTINUOUS MIXING PROCESS
[75] Inventor: Yngve R. Akesson, Hälsingborg, Sweden
[73] Assignee: Nestec S.A., Vevey, Switzerland
[21] Appl. No.: 732,356
[22] Filed: May 8, 1985
[30] Foreign Application Priority Data
Jul. 28, 1984 [EP] European Pat. Off. ........ 84108982.4
[51] Int. Cl.⁴ ............................................ A21D 10/00
[52] U.S. Cl. .................................... 426/549; 426/496; 426/519
[58] Field of Search .................. 426/519, 549, 496; 366/303, 307

[56] References Cited
U.S. PATENT DOCUMENTS

| | | | |
|---|---|---|---|
| 1,790,347 | 1/1931 | Hawkins | 426/519 |
| 2,631,101 | 3/1953 | Monk et al. | 366/303 |
| 2,870,026 | 1/1959 | Keller et al. | 426/519 |
| 2,915,023 | 12/1959 | Rapaport | 426/519 |
| 3,482,822 | 12/1969 | Krizak et al. | 366/303 |
| 3,615,243 | 10/1971 | Scott | 366/303 |
| 3,694,227 | 9/1972 | Vazzani | 426/519 |
| 3,788,609 | 1/1974 | Tolzyski et al. | 366/303 |
| 4,334,788 | 6/1982 | Miner | 366/303 |

Primary Examiner—George Yeung
Attorney, Agent, or Firm—Vogt & O'Donnell

[57] ABSTRACT

A process for preparing batter which comprises measuring out and mixing thoroughly appropriate quantities of flour and water characterized in that at least the flour is measured gravimetrically, the measured proportions of flour and water are fed continuously to a mixing device through which they flow by gravity and are mixed to form the batter which is removed continuously.

8 Claims, 3 Drawing Figures

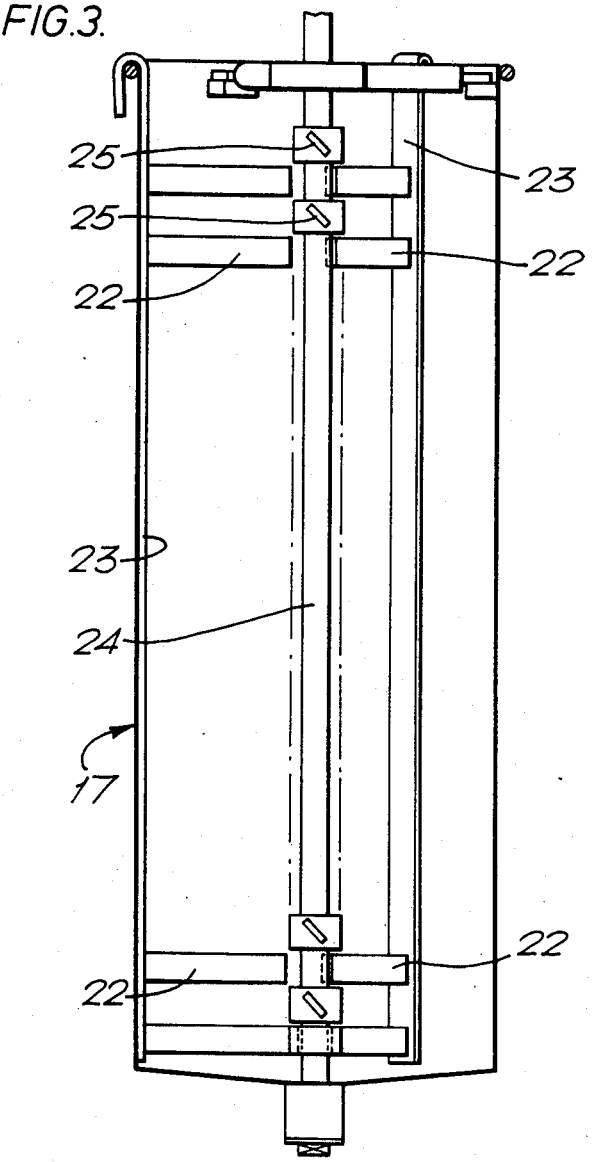

CONTINUOUS MIXING PROCESS

The present invention relates to a continuous mixing process, more particularly to a continuous process for mixing flour and water be weight to make batter.

Batter is usually made batchwise by measuring the flour volumetrically before mixing with the water. For example, the flour may be measured by means of a screw-feeder whereby the volume is determined by the number of turns of the screw. However, when flour is measured by volume, compaction of the flour occurs to varying degrees and, therefore, the ratio of flour to water in the mixture increases accordingly. As a result it is extremely difficult to obtain a consistently even mixture of flour and water and therefore it is almost impossible to control the viscosity of the batter produced. Moreover, when batter such as tempura batter is produced batchwise on an industrial scale, large quantities are usually prepared in each batch for practical and economic reasons and since the life time of a tempura batter is relatively short, the batter must used within in a relatively short period of time. Therefore, interruptions of the production e.g. meal breaks or mechanical breakdowns, can result in the loss of large quantities of batter.

We have found, surprisingly, that batter can be made by a continuous process in which at least the flour is measured gravimetrically. This continuous process has the advantage over a batchwise process in that the total volume in the system is much smaller and suitable quantities of batter can be prepared economically as and when desired. Moreover, the measurement of the flour gravimetrically instead of volumetrically has the advantage that the viscosity of the batter can be controlled very accurately before entering the batter applicator.

Accordingly, the present invention provides a process for preparing batter which comprises measuring out and mixing thoroughly appropriate quantities of flour and water characterised in that at least the flour is measured gravimetrically, the measured proportions of flour and water are fed continuously to a mixing device through which they flow by gravity and are mixed to form the batter which is removed continuously.

The measuring and feeding of the flour and water to the mixing device may be carried out by known means which may be, if desired, completely automatic. For example, one possible weighing method used for guaranteeing an even flow of flour in the required amount may be based on a weighing unit provided with load cells and a micro-processor. By programming the micro-processor for a certain feed rate, the speed of a screw feeder fitted to the bottom of the flour hopper is automatically adjusted to discharge the set amount in weight of flour per time unit. This means that the speed of the screw feeder will automatically be lower at a higher compaction of the flour and vice versa.

The means for ensuring the appropriate flow rate of water to the mixer may conveniently be provided by an ordinary piston pump fitted with a variable speed motor in which case the micro-processor is programmed to give the appropriate speed of the motor. The set ratio between flour and water may thus be adjusted to be the same at any time and various batter demands of the subsequent processing line.

The mixing device advantageously comprises a tube fitted with a plurality of fingers on its inside wall within which is a central shaft fitted with a plurality of fingers on its surface. At least one of the sets of fingers is adapted to rotate, preferably the set fitted to the central shaft which conveniently rotates at a low speed, especially for a tempura batter. Both sets of fingers are preferably arranged in one or more rows along the length of the tube and the central shaft, respectively, those along the length of the tube preferably overlapping those along the length of the central shaft and being disposed variously thereto to allow free rotation. When there are two or more rows of fingers, they are advantageously spaced substantially equidistantly around the central shaft and the inside wall of the tube, respectively. Preferably, there are from 2 to 15 fingers spaced around the shaft and preferably from 2 to 15 fingers spaced around the inside wall of the tube. The number of fingers in a row is preferably from 5 to 50, especially from 10 to 25. Conveniently, the static fingers are flat bars, preferably fitted in a vertical position to prevent substantial rotation of the batter. The rotary fingers are also conveniently flat bars, preferably with a pitch angle to improve the mixing operation by creating the required turbulence. The pitch angle is suitably from 30° to 60° and preferably from 40° to 50°.

Preferably, the mixing tube is positioned so that its longitudinal axis is vertical. The use of a vertical mixer substantially avoids the mixing of air into the batter and, as long as the flour is dry, it will float on top of the batter thereby avoiding insufficiently mixed batter entering the batter applicator.

Where the mixing device comprises a static tube and a central rotating shaft, the speed of rotation may be from 25 to 150, preferably from 50 to 120, and especially from 80 to 90 revolutions per minute. However, the speed can be adjusted so that it is slower for a low batter consumption to avoid overworking of the batter, and higher for a high batter consumption to avoid undermixing of the batter.

The duration of the mixing varies according to the batter demand, a lower batter demand requiring a longer mixing time and a higher batter demand requiring a shorter mixing time.

Figure 2:
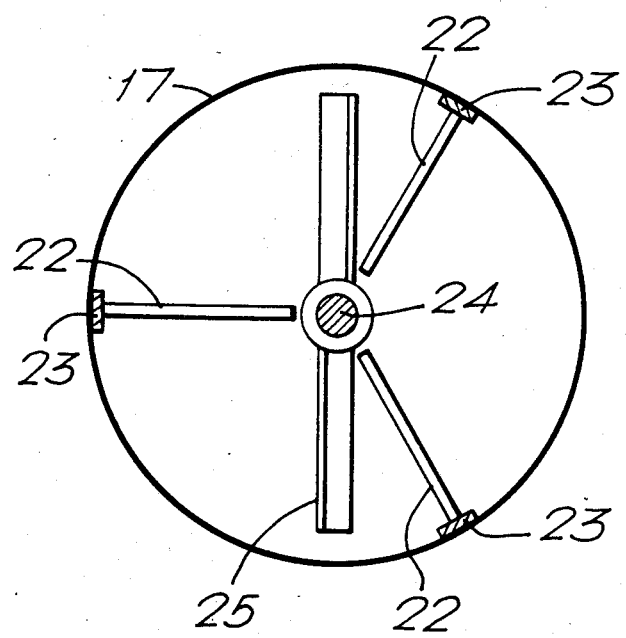

The present invention is illustrated by way of Example with reference to the following drawings in which FIG. 1 is a diagrammatic plan view, partly in section, of the machine used for preparing the batter, FIG. 2 is a cross-sectional view of the mixer tube and FIG. 3 is a vertical section showing the fingers on the shaft cross-section.

The batter mixer generally designated 10 is attached to a frame 11 provided with a base 12 the under side of which is provided with wheels (not shown) to enable the mixer to be moved easily. The batter mixer is provided with a hopper 13 containing flour. Fitted to the bottom of the hopper is a screw conveyor 14 which conveys the flour to a gravimetric scale 15 which discharges the flour via a feed duct 16 to a mixing tube 17 of 250 mm diameter, 700 mm length and capable of holding about 30 liters of batter. The gravimetric scale 15 is controlled by a micro-processor (not shown). A water pump 18 provided with a variable speed motor 19 controls the flow rate of the water from an inlet 20, the micro-processor having been programmed to give the appropriate speed of the motor. The water flows via a pipe 21 to the mixing tube 17 which is provided with static fingers 22 welded to bars 23 on its inside wall and a central rotary shaft 24 provided with fingers 25. The fingers are in the form of flat bars having a cross-section of 20×4 mm. The static fingers fully overlap the rotary fingers. The rotary finger bars are given a pitch of 45° to create the required turbulence in the batter mix while the static finger bars are fitted in the vertical position to substantially prevent rotation of the batter mix. The number of rotating fingers is 26, placed in 13 planes of rotation with 2 fingers in each plane while the number of static fingers is 39 also placed in 13 planes of rotation but with 3 fingers in each plane. An adjustable speed gear motor 26 controls the speed of rotation of the central shaft and to the base of the mixing tube is fitted an outlet pipe 27 leading to a batter applicator 28.

In operation, the micro-processor is programmed to supply flour and water at a certain feed rate, and flour from the hopper 13 is fed by means of the screw conveyor 14 to the gravimetric scale 15 and discharged continuously via the feed duct 16 to the mixing tube 17. At the same time the appropriate amount of water from the inlet 20 is fed by means of the water pump 18 via the pipe 21 to the mixing tube 17. The shaft 24 rotates at 88 rpm and the time of mixing is six minutes. The batter leaves the mixing tube via the outlet pipe 27 and, if desired, a level control device may be fitted into the batter applicator thus making it possible to produce automatically the required amount of batter for the batter applicator.

The flour used in this Example contains, in addition, baking powder and yeast, and is suitable for the production of a Tempura batter.

I claim:

1. A process for preparing a batter which comprises:
 continuously feeding gravimetrically measured quantities of flour and continuously feeding measured quantities of water to a mixing device, which comprises a tube containing a central shaft, a set of a plurality of fingers disposed about an inside wall of the tube along the length of the tube and a set of a plurality of fingers disposed about the shaft along the length of the shaft, wherein at least one set of the fingers is capable of freely moving in a manner which consists essentially of rotating;
 mixing the flour and water by rotating at least one of the sets of fingers to form the batter while the flour, water and batter flow by gravity through the tube, the at least one set of the fingers being rotated at a speed sufficient to create a turbulent condition during the mixing operation; and
 continuously removing the batter from the mixing device.

2. A process according to claim 1 wherein one set of fingers is static and wherein the fingers of the rotatable set of fingers are positioned at a pitch angle of from 30° to 60°.

3. A process according to claim 2 wherein the fingers of the rotatable set of fingers are flat bars.

4. A process according to claim 2 wherein the sets of fingers overlap and the set of static fingers are flat bars fitted such that the cross-section of the flat bars are in a vertical position.

5. A process according to claim 4 wherein the rotatable set of fingers is fitted to the central shaft and the fingers of the rotatable set of fingers are flat bars.

6. A process according to claim 1 wherein the rotatable set of fingers are fitted to the central shaft and rotate at from 25 to 150 revolutions per minute.

7. A process according to claim 1 wherein the tube is positioned so that its longitudinal axis is vertical.

8. A process according to claim 1 wherein the batter is a Tempura batter.

* * * * *

UNITED STATES PATENT AND TRADEMARK OFFICE
CERTIFICATE OF CORRECTION

PATENT NO. : 4,687,674

DATED : August 18, 1987

INVENTOR(S) : Yngve R. Akesson

It is certified that error appears in the above-identified patent and that said Letters Patent is hereby corrected as shown below:

On the title page of the patent under the heading "U.S. PATENT DOCUMENTS":

"Vazzani" should be --Vezzani--.

"Tolzyski et al." should be --Toczyski et al.--.

In column 2, line 48, after "shaft" insert --in--.

Signed and Sealed this

Fifteenth Day of December, 1987

Attest:

DONALD J. QUIGG

Attesting Officer     Commissioner of Patents and Trademarks